May 10, 1966  E. J. HLINSKY ETAL  3,250,492
AUTOMATIC REGULATOR FOR CABLE REEL
Filed Sept. 21, 1964  3 Sheets-Sheet 2

INVENTORS
Melvin G. Carlson
Emil J. Hlinsky
Herman Linkowski
BY
ATTYS.

May 10, 1966 E. J. HLINSKY ETAL 3,250,492
AUTOMATIC REGULATOR FOR CABLE REEL
Filed Sept. 21, 1964 3 Sheets-Sheet 3

INVENTORS
Melvin G. Carlson
BY Emil J. Hlinsky
Herman Linkowski

ATTYS.

United States Patent Office 3,250,492
Patented May 10, 1966

3,250,492
AUTOMATIC REGULATOR FOR CABLE REEL
Emil J. Hlinsky, La Grange Park, Herman Linkowski, Chicago, and Melvin G. Carlson, Oak Lawn, Ill., assignors to Goodman Manufacturing Company, Chicago, Ill., a corporation of Illinois
Filed Sept. 21, 1964, Ser. No. 397,684
9 Claims. (Cl. 242—86.51)

This invention relates to improvements in hydraulic drives and control circuits for cable reels and the like.

Heretofore, cable reels, reeling and unreeling electric cable, supplying electrical power to electrically powered vehicles, such as shuttle cars used in mines, have been arranged to establish a higher torque on the cable reel during reeling than unreeling. Such systems have used a single main hydraulic pump and the discharge from the pump has been controlled by a sensor, sensing the direction of rotation of the reel and reducing the pressure of oil supplied to the reel motor during unreeling of the cable. With such systems the high capacity main pump discharges against a high back pressure as the reel motor is standing and at a lower pressure, when the reel motor is driven as a pump and its discharge output combines with output of the pump, with the resultant excessive heating of the hydraulic fluid.

A principal object of the present invention is to remedy the foregoing deficiencies by reducing the pumping capacity both in volume and pressure, during unwinding of the cable under the control of a sensor, sensing the direction of rotation of the drive motor.

A further object of the invention is to provide an improved form of hydraulic system for operating cable reels and the like in which a larger volume of fluid at a high pressure is delivered to the reel motor during winding than unwinding of the reel, by the use of multiple supply pumps controlled by a sensor, sensing the conditions of winding and unwinding and effecting the bypass of the fluid delivered from one of the pumps to tank during the unwinding operation and when the reel is idle.

A further object of the invention is to provide a novel form of hydraulic drive for a cable reel and the like in which multiple supply pumps supply fluid to the cable reel drive motor during winding and a sensor, sensing the conditions of the cable reel, operates a valve means, bypassing the fluid delivered by one of the pumps to tank during unwinding and directing the capacity of the same pump to the cable reel drive motor during winding.

A still further object of the invention is to establish a desired tension on a cable paid off or wound on a cable reel by the use of a sensor, sensing the direction of rotation of the cable reel, and by the use of tandem driven pumps of different capacities, in which the sensor supplies the pressure to operate an unloading valve, bypassing the capacity of the higher capacity pump of the two pumps during unwinding and stalling of the reel.

These and other objects of the invention will appear from time to time as the following specification proceeds and with reference to the accompanying drawings wherein.

Figure 1:
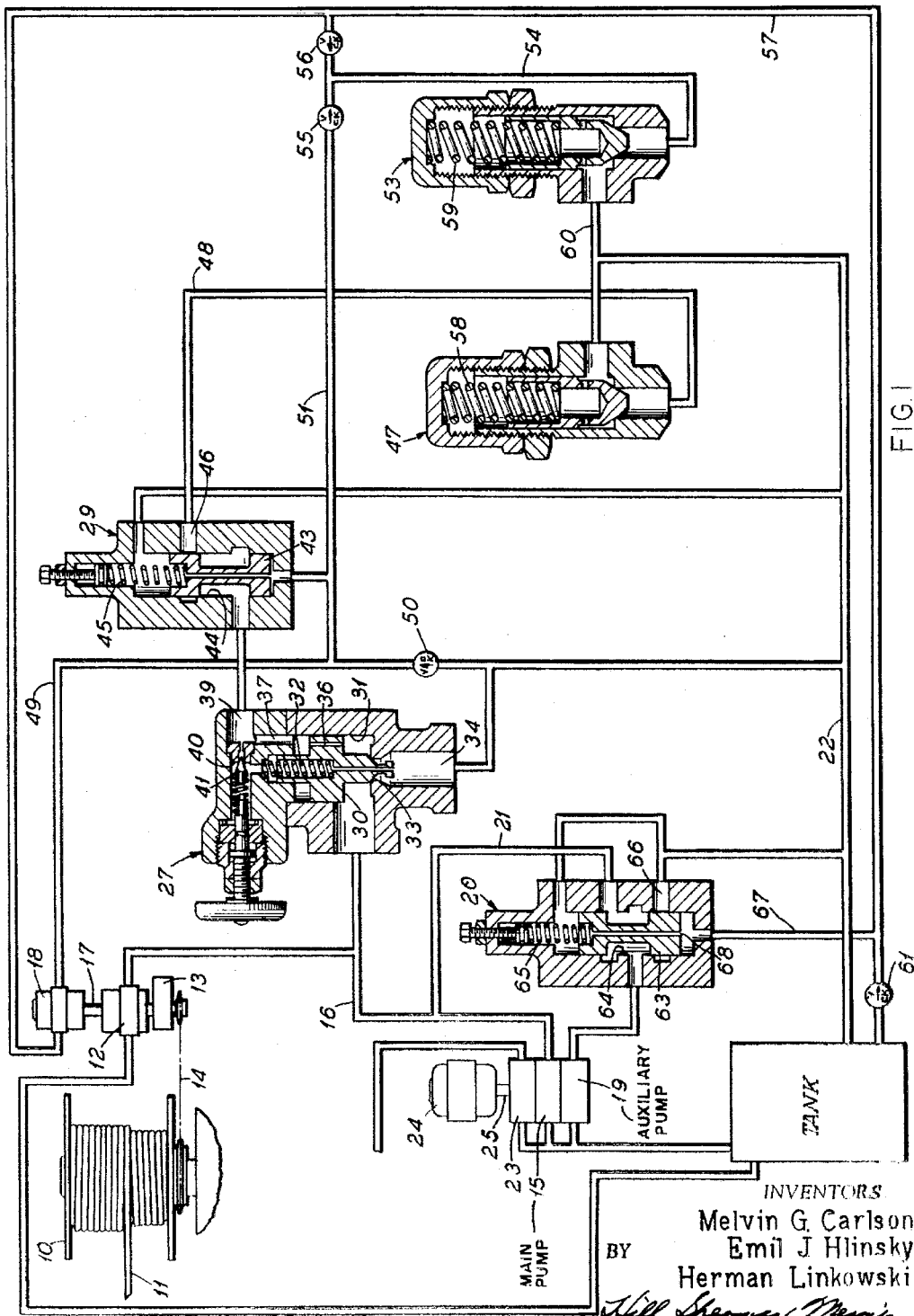
FIGURE 1 is a diagrammatic view illustrating a form of fluid pressure reel operating circuit arranged in accordance with the principles of the present invention.

In the embodiment of the invention illustrated in the drawings, we have shown a cable reel 10 having an electric cable 11 wound thereon, which may be connected with a source of electric power by a fixed nip at the free end of the cable. The reel may be mounted on a mine vehicle, such as a shuttle car and the like, and is adapted to move toward and past the fixed nip during the operation of transferring a load of material from a loading to a discharge station. It should here be understood that the fluid circuit of the present invention, while shown as applied to drive a cable reel and maintain the required tension on the reel during standing of the vehicle and movement of the vehicle toward and from and past a fixed nip, that the circuit of the present invention need not necessarily be applied to drive a cable reel, but may be applied to various tensioning devices in which it is advantageous to provide a relatively high pressure while taking up on a member and a lower pressure when paying out the member.

The cable reel 10 may be of a conventional form and is diagrammatically shown in FIGURE 1 as driven from a fluid pressure motor 12, driving a speed reducer 13 having driving connection with the cable reel through a chain and sprocket drive 14.

A main fluid pump 15 is connected by a main pressure line 16 to the reel motor 12, which drives the cable reel 10 during the winding operation and is driven from the cable reel 10 during the unwinding operation. The reel motor 12 has a motor shaft 17 extending from opposite ends thereof, one end of which drives the speed reducer 13 and cable reel 10 while the opposite end of which drives a sensor 18, which may be a pump, like the reel motor and senses the direction of rotation of said motor.

An auxiliary pump 19 is shown in FIGURE 1 as being disposed in tandem relation with respect to the main pump 15 and supplying fluid under pressure to a pilot-operated unloading valve 20. The pilot-operated unloading valve 20 is operated by pressure supplied by the sensor, to connect the auxiliary pump to the pressure line 16 through a pressure line 21 during driving of the cable reel 10 in a winding direction and to unload the pump 19 against very little back pressure to return the fluid pumped thereby to tank through a return line 22 during unwinding, as will hereinafter more clearly appear as this specification proceeds.

A pump 23 is shown as being arranged in tandem relation with respect to the main pump 15 and the auxiliary pump 19, and is provided to supply fluid under pressure for the steering system of the vehicle. This pump is no part of the present invention so need not herein be shown or described further.

The pumps 15, 19 and 23 are all shown as being driven from a motor 24 through a common drive shaft 25.

The pressure line 16 has connection with a pilot-operated relief valve 27 downstream of the connection of the pressure line 21 thereto. The pilot-operated relief valve 27 is automatically controllable to relieve the main pressure line 16 at a high pressure range, which is determined by the torque requirements of the cable reel during winding, and which may be in the order of 500 p.s.i., or at a lower pressure range, which may be in the order of 200 p.s.i.

A pilot-operated diverting valve 29, cooperates with the pilot-operated relief valve 27, to cause the relief valve to relieve pressure at the lower pressure range. The pilot-operated relief valve 27 is set to relieve pressure at the lower pressure operating range of said valve, as controlled by pressure derived from the sensor 18, when driven by the cable reel, as the reel is paying off cable.

The pilot-operated relief valve 27, when relieving pressure from the line 16, at its low pressure operating range, therefore, reduces the back pressure during the unwinding operation of the cable reel in a manner similar to that shown and described in an application Serial No. 175,095, filed February 13, 1962 by Melvin G. Carlson and Herman Linkowski and entitled "Automatic Regulator for Cable Reel" and now Patent No. 3,158,365.

The pilot-operated relief valve 27 may be like that shown and described in the aforementioned application Serial No. 175,095 and has a balanced piston 30 movable along a valve chamber 31 against a spring 32, upon the application of fluid under pressure to the piston 30 from the pressure line 16. The piston 30 has a valve 33 connected thereto and cooperating with a port 34 to relieve pressure in the pressure line 16 and return fluid back to tank through the return line 22.

The piston 30 also has a balancing passageway 36 leading therethrough to effect the balancing of pressure on opposite sides of said piston. A passageway 37 on the opposite side of the piston from the valve 33 has communicaiton with the pilot-operated diverting valve 29 through a port 39. A seat 40 for a poppet valve 41 has communication with the port 39. The poppet valve 41 is manually operable to control the setting of the relief valve in a conventional manner, so need not herein be shown or described further.

The pilot-operated diverting valve 29 has a valve piston or spool 43 movable along the valve chamber 44 and biased by a spring 45 to block the flow of fluid through an outlet port 46 of said valve. The port 46 is connected with a low pressure relief valve 47 through a pressure line 48. When the port 46 is blocked, the pilot-operated relief valve 27 will then operate to relieve pressure from the pressure line 16 only at the high pressure setting of the valve.

A fluid line 49 leads from the sensor 18 to the return line 22 and has a check valve 50 therein, accommodating the sensor to draw fluid from tank through the line 49 when driven by the reel motor 12 during the winding operation, and holding pressure in the line 49 upstream of the check valve 50 as the sensor 18 is driven by the reel. A pressure line 51 is connected from the line 49 upstream of the check valve 50 to a back pressure valve 53 through a pressure line 54. Check valves 55 and 56 are provided on opposite sides of the juncture of the line 54 to the line 51. The check valve 55 is set to accommodate the flow of fluid under pressure from the line 51 through the line 54 to the back pressure valve 53. The check valve 56 is set to block the flow of fluid under pressure from the line 51 to a pressure line 57 and to accommodate the flow of fluid under pressure from the pressure line 57 through the line 54 to the back pressure valve 53. The back pressure valve 53 is regulated by a spring 59 to provide sufficient pressure in the line 51 to move the valve spool 43 against its spring 45 into position to accommodate the flow of fluid through the port 46 and line 48 to the low pressure relief valve 47 when the reel is paying off cable. This will reduce the back pressure on the valve piston 30 of the pilot-operated relief valve 27 to the loading of the low pressure relief valve 47, and will thereby accommodate the operation of the relief valve 27 to return fluid to the return line 22 through the port 34, at the setting of the low pressure relief valve 47.

The low pressure relief valve 47 is loaded by a spring 58 to the low pressure setting of the pilot-operated relief valve 27 and thus determines the pressure at which the relief valve 27 will open at its low pressure setting when the sensor 18 is driven by the reel 10, and supplies pressure to the spool 43, to open the port 46 to said low pressure relief valve 47. The discharge ports of the back pressure valve 53 and the low pressure relief valve 47 are connected with the return line 22 through a common return line 60.

The line 57 leads from the sensor to tank and has a suction check valve 61 therein, accommodating the flow of fluid from tank through line 57 to the sensor 18 as said sensor pump is driven by the reel 10, during the paying off of cable, and clocking the return of fluid from the line 57 to tank as the sensor pump 18 is driven by the reel motor during the winding operation.

The back pressure valve 53 connected with the line 57 through the check valve 56 and line 54, thus governs the pressure in the line 57 when the sensor 18 is driven by the reel motor 12 during the winding operation and thereby provides the back pressure for operating the pilot-operated unloading valve 20.

The pilot-operated unloading valve 20 may be like the pilot-operated diverting valve 29 and has a valve spool 63 moved along a valve chamber 64 against the spring 65 to provide a fluid pressure connection to the line 21 by pressure supplied by the line 57 through a pressure line 67, leading from the line 57, upstream of the check valve 61, to the valve chamber 64, for supplying fluid to the bottom of the valve spool 63. Movement of the valve spool 63 by the bias of the spring 65 will open the port 66, and thereby dump the auxiliary pump 19 during the unwinding operation, and during stalling of the reel when the vehicle is standing against the relatively low back pressure in the line 22. A bleed line 68 leads through the valve spool 63 to allow fluid to bleed from the bottom of the spool as sensor pump stops.

Figure 2:
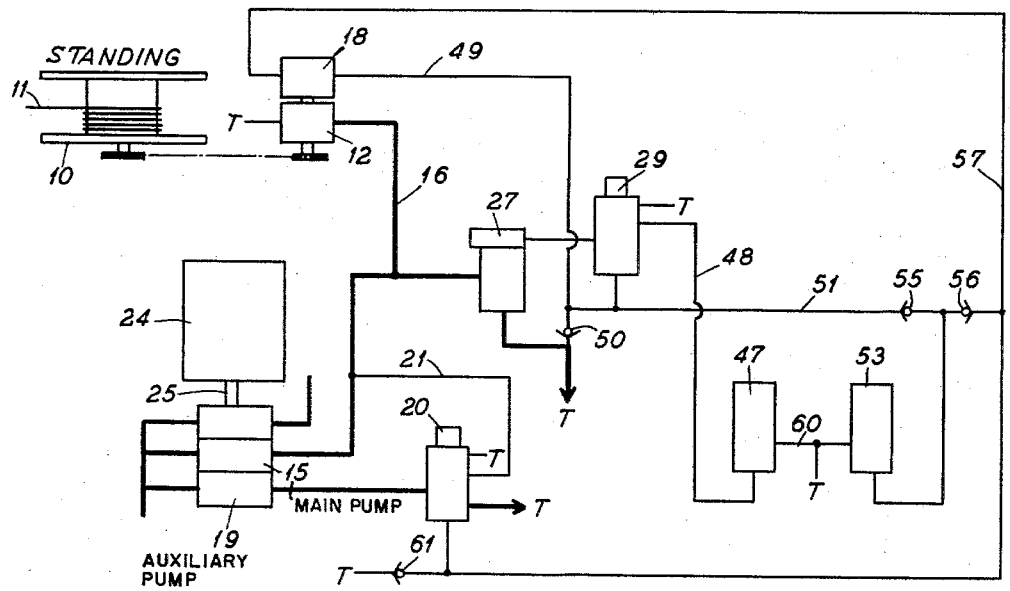
FIGURE 2 is a fragmentary diagrammatic view, schematically illustrating the flow through the system when the reel is stationary and hydraulic pressure is maintained on the cable reel drive motor to maintain tension on the cable.
Figure 3:
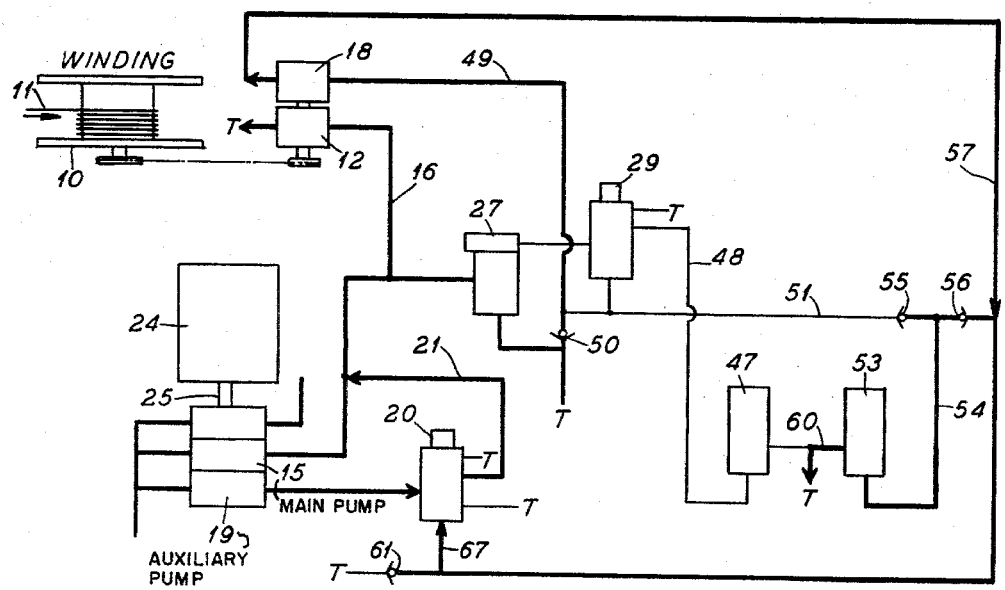
FIGURE 3 is a view somewhat similar to FIGURE 2 but showing the flow of hydraulic fluid during the winding operation.
Figure 4:
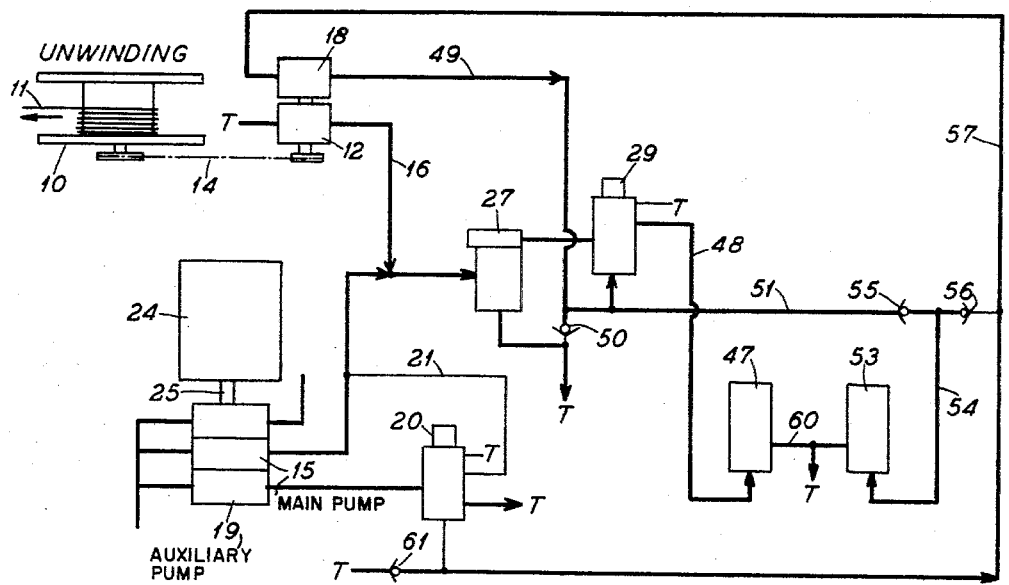
FIGURE 4 is a view somewhat similar to FIGURES 2 and 3 and showing the flow of hydraulic fluid during the unwinding operation.

FIGURES 2, 3 and 4 illustrate the fluid flow paths in the various operating positions of the reel. In these figures the valves are the same as in FIGURE 1, as are the fluid connections to and from said valves. The interior positions of the valve spools and pistons in FIGURE 1, however, correspond to the winding position of FIGURE 3.

Referring now to FIGURE 2, when the vehicle is standing and tension is maintained on the cable 11 by the reel motor 12, the fluid delivered by the main pump 15 discharges through pilot-operated relief valve 27 to tank against the high pressure setting of said relief valve, which may be in the order of 500 p.s.i. The pressure applied to the reel rotor 12 by the pump 15 holds the cable 11 in a snug wound up position. Since the sensor 18 is not in operation, pressure will be relieved from the valve spool 63 and accommodate the spring 65 to move said valve spool along the valve chamber 64 to open the port 66 to the return line 22 and tank.

It should here be understood that the main pump 15 is a relatively low capacity pump and may have a capacity of 3 g.p.m., while the auxiliary pump 19 is a relatively high capacity pump and may have a capacity of 9 g.p.m. During stalling of the vehicle, therefore the low capacity pump is supplying fluid under pressure to maintain tension on the cable 11, while the auxiliary high capacity pump is unloaded through the return line by the pilot-operated unloading valve 20. Back pressure in the return line 22 is minimal, in the neigborhood of 50 p.s.i., which is not sufficient to cause over-heating of the oil, when so circulated.

During the winding operation, as shown in FIGURE 3, as the vehicle is moving toward the nip connecting the cable 11 to its source of electric power, the two pumps 15 and 19 will both be in use to supply fluid to the reel motor 12. The main pump 15 directs its output through the line 16 into the reel motor 12, providing sufficient wind-up speed to utilize the entire capacity of this pump, which is the case at the higher winding speeds.

During this winding condition, the sensor 18, driven from the reel pump 12, directs fluid through the line 57 in the direction of the arrows to the back pressure valve 53 through the check valve 56 and line 54. When the pressure in the lines 54 and 57 reaches the setting of said back pressure valve 53, the piston of said back pressure valve will be lifted. Part of the fluid passing through the line 57 will then return to tank through the return connection 60 and the return line 22. The back pressure valve 53 will thus govern the pressure in the line 57, which as previously mentioned, may be 150 p.s.i. and supply the pressure through the line 67 to lift the valve spool 63 into the position shown in FIGURE 1. Upon lifting of the spool 63, the output of the auxiliary pump 19 will be joined with the output of the main pump 15 through the pilot-operated unloading valve 20 and the pressure line 21 leading to the pressure line 16. The combined outputs of the two pumps, which may total 12 g.p.m. in the present instance, are then available to drive the reel motor 12 in a winding direction. Any excess capacity is released through the pilot-operated relief valve 27, opening at its high pressure setting.

As the vehicle is travelling away from the nip connecting the cable 11 to the source of power, and cable is paid off the reel 10, the conditions illustrated in FIGURE 4 will apply. The sensor 18 will be driven by the reel 10 and direct fluid along the line 49 in the direction of the arrows to pass through the line 51 and the line 54 to the back pressure valve 53. This valve will maintain a back pressure on the line 51 in accordance with the setting of the valve, and sufficient to move the spool 43 of the pilot-operated diverting valve 29 into position to accommodate the flow of fluid from the port 39 of the pilot-operated relief valve 27 out the port 46 of the pilot-operated diverting valve 29, through the line 48 to the low pressure relief valve 47 and back to tank, when the pressure reaches the pressure setting of said relief valve, which as previously mentioned may be 200 p.s.i. Pressure will then be diverted from the top of the pilot-operated relief valve 27 through the low pressure relief valve 47, enabling the pilot-operated relief valve 27 to relieve the main pressure line at the pressure setting of the low pressure relief valve 47, namely 200 p.s.i. During the unwinding condition, pressure is relieved from the line 67 and the spring 65 moves the spool 63 in position to dump fluid through the port 66 to tank through the return line 22.

The auxiliary high capacity pump being unloaded through the unloading valve 20 to tank, only the output from the main pump 15, namely 3 g.p.m. and the output from the reel motor 12, driven as a pump from the reel 10 are fed into opposite ends of the pressure line 16 and will be discharged through the pilot-operated relief valve 27 at the pressure setting of the low pressure relief valve 47, as previously described. During this condition the check valve 61 allows the intake of fluid along the line 57 to the intake side of the sensor pump 18.

It may be seen from the foregoing that a simplified fluid pressure operating and control system and drive to a cable reel has been provided in which the cable reel is driven at a relatively high torque when winding cable on the reel, as the reel is moving toward the nip, and that a relatively low torque is maintained on the cable reel as the reel is paying off cable, as the vehicle carrying the reel moves away from the nip, to provide a substantial uniform tension on the cable during winding in and paying out of the cable, and that this is attained by the pilot-operated relief valve 27 under the control of the sensor 18 and the pilot-operated diverting valve 29, in which the relief valve is shifted to a low unloading range during unwinding under control of the sensor 18 and diverting valve 29, and the large capacity pump of the multiple pumps is unloaded under the control of the sensor 18 and the unloading valve 20 to divert its capacity back to tank under minimal back pressure during stalling and unwinding of cable from the reel.

It may further be seen that this system not only provides the required high torque for winding and low torque for paying out and maintaining the required tension on the cable, but also avoids undue heating of the oil by unloading the high capacity pump under minimal back pressure during unwinding and stalling of the reel, and using only the low capacity pump to maintain the proper tension on the cable.

While we have herein shown and described one form in which the invention may be embodied, it may readily be understood that various modifications and variations in the invention may be attained without departing from the spirit and scope of the novel concepts thereof.

We claim as our invention:

1. In a fluid pressure system for controlling the drawing in and paying out of a flexible member,
   a motor supplying the power to draw in the member,
   said motor being driven as a pump during paying out of the member,
   a main pump,
   an auxiliary pump operating simultaneously with said main pump,
   a fluid pressure connection from said main pump to said motor,
   an unloading valve,
   a fluid pressure connection from said auxiliary pump to said motor through said unloading valve, and means sensing the direction of rotation of said motor and effecting operation of said unloading valve to effect the supply of fluid under pressure to said motor by both of said pumps during operation of said motor, to draw in the flexible member, and to unload said auxiliary pump through said unloading valve when said motor is driven by said flexible member.

2. A fluid pressure system in accordance with claim 1 in which the sensing means is a sensor pump driven by the motor and supplies the fluid to operate said unloading valve to direct fluid from said auxiliary pump to said motor, and in which a back pressure valve connected with the discharge from said sensor pump governs the pressure of operation of said unloading valve, to move said unloading valve in position to effect the supply of fluid under pressure from said auxiliary pump to said motor.

3. In a fluid pressure system for controlling the torque transmitted to a reel to draw in and pay out a flexible member,
   a fluid pressure reel motor supplying the power to drive said reel to draw in the flexible member,
   said reel motor being driven by the reel during paying out of the flexible member,
   a main pump,
   an auxiliary pump,
   a source of supply of fluid under pressure,
   a fluid pressure connection from said main pump to said reel motor,
   a fluid pressure operated unloading valve,
   a fluid pressure connection from said auxiliary pump to said motor through said unloading valve,
   a reel direction sensing means directly connected with said reel motor,
   means biasing said unloading valve into position to unload said auxiliary pump to the source of supply of fluid,
   and a fluid pressure connection from said sensing means to said unloading valve to move said valve against said biasing means and hold said valve in position to effect the supply of fluid under pressure from said auxiliary pump to said motor in addition to the fluid supplied to said motor by said main pump, when said motor is driving said reel.

4. A fluid pressure system in accordance with claim 3 in which the sensing means is a sensor pump directly connected with said motor, wherein the sensor pump, during the winding operation, supplies the pressure to hold said unloading valve in position to effect the supply of fluid pressure from said auxiliary pump to said motor, and wherein the pressure for operating said unloading valve is maintained by a back pressure valve connected with the discharge from said sensor pump during the cable winding operation.

5. A fluid pressure system in accordance with claim 3 in which the main pump and the auxiliary pump are directly connected and driven together, wherein the sensing means is a sensor pump directly connected with the reel motor, wherein the sensor pump driven by the motor during the winding operation supplies the fluid under pressure to hold said unloading valve in position to effect the supply of fluid under pressure from said auxiliary pump to said motor, and wherein the pressure for operating said unloading valve against its bias is maintainred by a back pressure valve connected with the discharge from said sensor pump when driven by said motor during a cable drawing in operation.

6. In a cable reel mechanism for a vehicle adapted to be supplied with electric power from a fixed nip and adapted to move toward and away from and past said nip, characterized by a cable reel mounted on said vehicle for movement therewith, a cable wound on said reel and connected to said nip for providing a power connection from said nip to said vehicle and adapted to be wound upon or payed off of said reel when said vehicle moves toward or away from said nip, a tank, a main pump with its input connected to said tank, a fluid motor-pump unit connected to the main pump by a main pressure line and drivably connected to said reel and driven in one direction by pressure fluid from said pump as a fluid motor for driving said reel to wind cable thereon, and driven in the opposite direction as a pump responsive to movement of said reel in a direction to pay off cable therefrom, control valve means for controlling the pressure of said pressure fluid in said main pressure line, the improvement comprising:

an auxiliary pump,
an auxiliary pressure line connecting the auxiliary pump to said main pressure line,
a bypass valve in said auxiliary pressure line being connected to said tank and operable between a supply position in which it directs fluid from the auxiliary pump to the main pressure line, and a bypass position in which it directs fluid from the auxiliary pump to the tank,
a reel direction sensor,
bypass valve control means responsive to the reel direction sensor and automatically effective to maintain said bypass valve in its supply position during reel windings,
whereby said bypass valve automatically directs the auxiliary pump output into the main pressure line to augment the flow from the main pump to the motor-pump during cable reel winding,
and whereby further said bypass valve automatically diverts the auxiliary pump output to tank during cable reel unwinding.

7. In a cable reel mechanism, the combination of claim 6 in which said control valve means comprises high and low pressure relief valve means, and means responsive to the reel direction sensor to automatically block flow from the main pressure line through the low pressure relief valve means during cable reel winding, and to automatically enable flow therethrough during cable reel unwinding.

8. In a cable reel mechanism, the combination of claim 6 in which said main and auxiliary pumps are simultaneously driven.

9. In a cable reel mechanism, the combination of claim 6 in which said main and auxiliary pumps are driven by common drive means.

References Cited by the Examiner

UNITED STATES PATENTS 2,467,238  4/1949  Slomer _____ 242—86.51

STANLEY N. GILREATH, *Primary Examiner.*

MERVIN STEIN, *Examiner.*

N. L. MINTZ, *Assistant Examiner.*